United States Patent [19]

Isobe et al.

[11] Patent Number: 5,084,342

[45] Date of Patent: Jan. 28, 1992

[54] MAGNETIC RECORDING MEDIUM

[75] Inventors: Ryosuke Isobe; Yasuo Ando, both of Hino, Japan

[73] Assignee: Konica Corporation, Tokyo, Japan

[21] Appl. No.: 344,002

[22] Filed: Apr. 26, 1989

[30] Foreign Application Priority Data

Apr. 28, 1988 [JP] Japan ................................. 63-107214
Apr. 28, 1988 [JP] Japan ................................. 63-107215

[51] Int. Cl.$^5$ .............................................. G11B 23/00
[52] U.S. Cl. ..................................... 428/329; 428/402; 428/694; 428/900
[58] Field of Search ............... 428/328, 329, 402, 403, 428/694, 900; 252/62.54, 62.58, 62.62

[56] References Cited

U.S. PATENT DOCUMENTS

| | | | |
|---|---|---|---|
| 4,082,905 | 4/1978 | Stephan et al. | 252/62.58 |
| 4,632,868 | 12/1986 | Miyoshi et al. | 428/403 |
| 4,801,505 | 1/1989 | Ejiri et al. | 428/323 |
| 4,874,668 | 10/1989 | Asada et al. | 428/403 |
| 4,882,224 | 11/1989 | Moro et al. | 428/403 |
| 4,923,519 | 5/1990 | Rodi et al. | 428/403 |
| 4,956,220 | 9/1990 | Sueyoshi et al. | 428/900 |

FOREIGN PATENT DOCUMENTS 56257 7/1982 European Pat. Off. .
195675 9/1986 European Pat. Off. .

*Primary Examiner*—Paul J. Thibodeau
*Attorney, Agent, or Firm*—Jordan B. Bierman

[57] ABSTRACT

A magnetic recording medium is disclosed. The magnetic recording medium is capable of high density recording; has excellent electromagnetic conversion properties including S/N ratio; whose magnetic powder has good dispersibility and good corrosion resistance; and that has good durability. The magnetic recording medium has a magnetic layer comprising a binder and magnetic metal powder dispersed in the binder. The powder has a specific surface area of not less than 45 m$^2$/g, and comprises not less than 90 atomic % of iron atoms, not less than 0.1 atomic % to less than 5 atomic % of aluminum atoms and not less than 0.1 atomic % to less than 10 atomic % of nickel atoms and the aluminum atoms present in the superficial portion of individual particles of the powder are bound with oxygen atoms.

7 Claims, 9 Drawing Sheets

F I G. 1
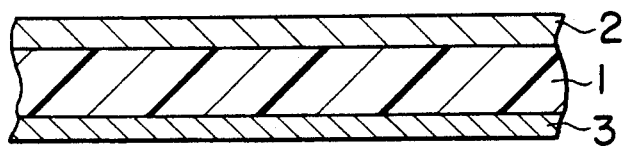
F I G. 2
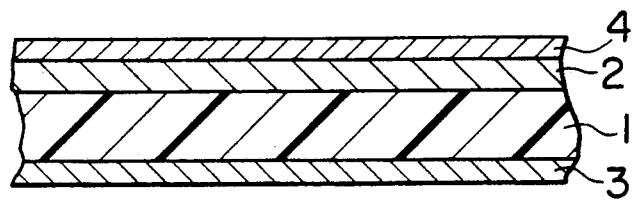

MAGNETIC RECORDING MEDIUM

FIELD OF THE INVENTION

The present invention relates to a magnetic recording medium such as a magnetic tape, magnetic sheet, and magnetic disk.

BACKGROUND OF THE INVENTION

The higher density and higher S/N ratio of recent magnetic recording medium such as a magnetic tape requires increasingly finer-sized magnetic powder.

According to a widely accepted theory, the S/N ratio of a magnetic recording medium is proportional to the square root of a number of magnetic particles in a specific amount of recording material that is responsible for recording and reproducing data. Therefore, if a specific weight of magnetic powder is employed for coating, a powder of smaller particle size is more advantageous in improving the S/N ratio. Additionally, using finer magnetic particles for improving the BET value of the magnetic powder accordingly results in smooth-surfaced magnetic layer, and, also, smaller spacing loss, this in turn is advantageous in attaining higher electromagnetic conversion properties. Using magnetic metal powder enables further enhanced high-density recording, thereby improves the performance of the magnetic recording medium.

To sum up, the magnetic metal powder has large saturated magnetization and large coersive force, and therefore, excels in characteristics for high-density recording material. However, its high surface activity incurs the following two problems:

(1) Oxidation resistance of magnetic metal powder in air The magnetic metal powder, when allowed to stand in air, gradually develops deterioration in magnetic property due to progressive oxidation.

(2) Dispersibility in binder

Higher surface activity of magnetic metal powder, when the powder is dispersed in a binder, results in poor dispersibility of the powder. Dispersing the magnetic metal powder is quite difficult, and, in the worst case, the similar powder gelate a binder resin in a coating solution.

The scope of applications of video tapes has been more diversified recently, and video tapes are subjected to various operating conditions. Therefore, good corrosion resistance is required of video tapes.

SUMMARY OF THE INVENTION

The object of the invention is to provide a magnetic recording medium that is capable of high density recording; has excellent electromagnetic conversion properties including S/N ratio; whose magnetic powder has good dispersibility and good corrosion resistance; and that has good durability.

The object of the invention is achieved by a magnetic recording medium having a magnetic layer which comprises a binder and magnetic metal powder dispersed in the binder, wherein the magnetic metal powder has a specific surface area of not less than 45 $m^2/g$; and comprises not less than 90 atomic % of iron atoms, 0.1 to 5 atomic % of aluminum atoms, and 0.1 to 9.9 atomic % of nickel atoms; and that the aluminum atoms in the superficial portion of individual particles of the magnetic metal powder are bound with oxygen atoms.

BRIEF DESCRIPTION OF THE DRAWINGS

Each of FIGS. 1 and 2 is a partially enlarged cross section illustrating one example of a magnetic recording medium of the invention.

DETAILED DESCRIPTION OF THE INVENTION

Figure 3:
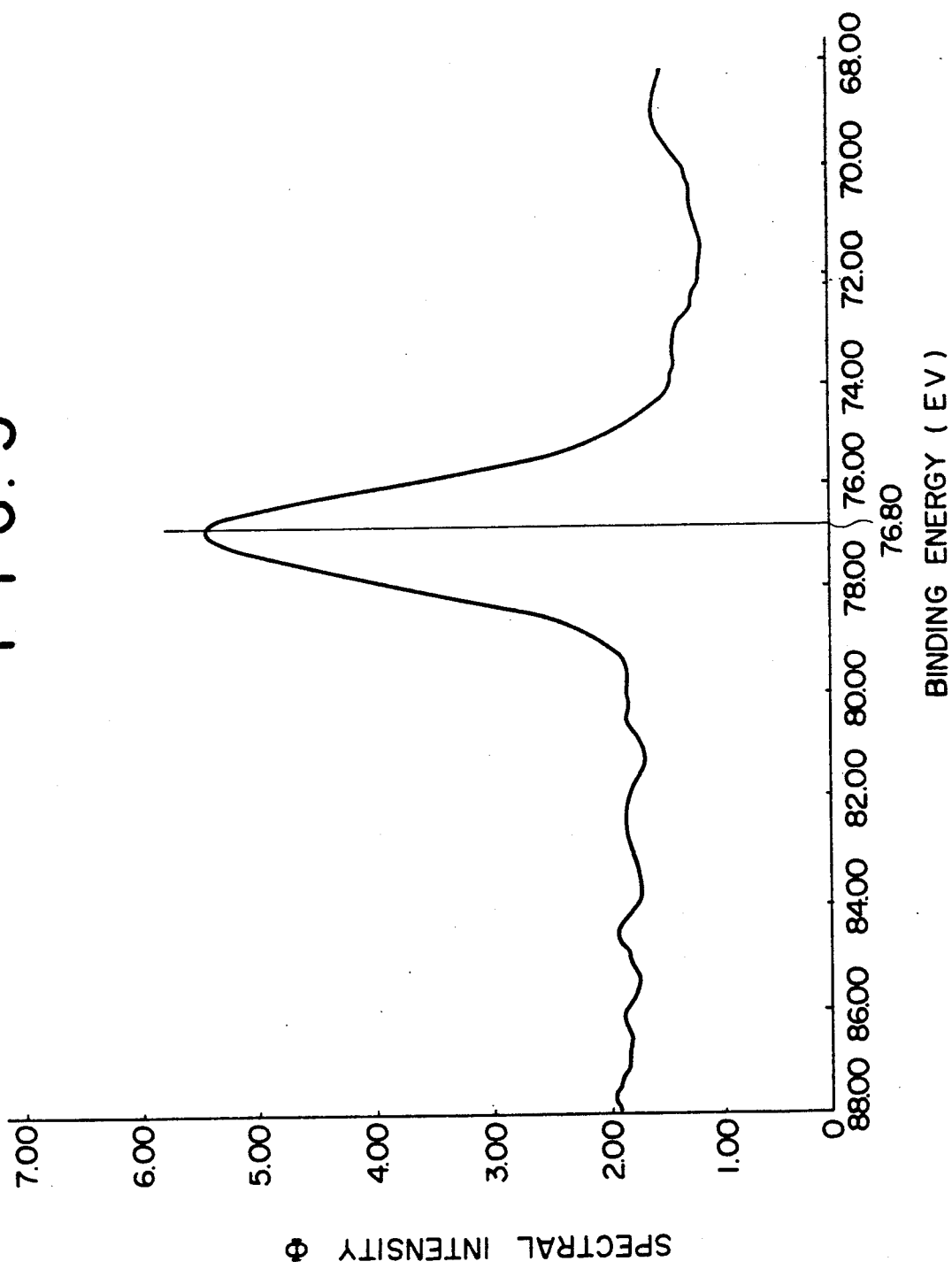
FIG. 3 graphically illustrates status of aluminum atoms in the surface regions of individual magnetic metal particles.

Owing to a magnetic metal powder whose specific surface area being not less than 45 $m^2/g$, the present invention provides a recording medium that is capable of high density recording and has an excellent S/N ratio and other properties. A magnetic metal powder whose specific surface area being not less than 50 $m^2/g$ and not more than 70 $m^2/g$ is more advantageous.

Also, owing to an iron atom content of not less than 90 atomic % in magnetic metal powder, a magnetic recording medium of good electrical properties is provided. Since the magnetic metal powder contains 0.1 to 5 atomic %, preferably 1 to 5 atomic %, of aluminum atoms, corrosion resistance action of aluminum is positively provided, and dispersibility of ultra-fine magnetic metal particles is improved. Furthermore, a nickel atom content of 0.1 to 9.9 atomic % preferably 1 to 8 atomic %, positively prevents sintering of magnetic powder.

Aluminum atoms present in the superficial portion of individual magnetic metal particles are bound with oxygen atoms, so that the amount of active sites in individual magnetic metal particles is further smaller, thereby surface activity is inhibited. Accordingly, corrosion resistance action and dispersibility improving of action aluminum atoms are further enhanced, thereby corrosion resistance and dispersibility of magnetic metal powder are further improved, resulting in a much durable magnetic recording medium.

The preferable abundance ratio among iron atoms, aluminum atoms, and nickel atoms present in the superficial portion of individual magnetic metal particles is (100):(40 to 140):(0 to 10).

In other words, a greater abundance ratio of aluminum atoms present in the superficial portion of individual magnetic metal particles, as well as a smaller abundance ratios of iron atoms and nickel atoms, contribute to further enhanced corrosion resistance action of aluminum atoms, thereby oxidization of magnetic powder is inhibited. This arrangement is also useful in preventing aggregation of magnetic metal particles, and in promoting dispersibility of magnetic powder. A smaller abundance ratio of nickel atoms, which readily develop rust, in the superficial portion of individual magnetic metal particles is especially effective in improving oxidization resistance of magnetic metal powder.

The "superficial portion" according to the invention is defined as "superficial portion of magnetic particles, not deeper than approx. 100 Å from the surface toward core, where the depth can be analyzed by ESCA (electron spectroscopy for chemical analysis)".

The examples of useful magnetic metal powder include a similar powder obtained by a dry reducing process where iron oxide is reduced using hydrogen or the like.

Examples of a magnetic metal powder type used in embodying the invention are Fe—Al—Ni, Fe—Ni—Al—Si—Zn and Fe—Ni—Al—Si—Mn.

The particularly preferred magnetic metal powder is ferromagnetic powder characterized in that it contains iron atoms, nickel atoms, aluminum atoms and silicon atoms, as well as at least either zinc atoms or manganese atoms wherein the content of the iron atoms is not less than 90 atomic %, the content of the nickel atoms is from not less than 1 atomic % to less than 10 atomic %, preferably not less than 3 atomic % to not more than 9 atomic %, the content of the aluminum atoms is from not less than 0.1 atomic % to less than 5 atomic %, preferably not less than 0.5 atomic % to not more than 4 atomic %, the content of the silicon atoms is from not less than 0.1 atomic % to less than 5 atomic % preferably not less than 0.5 atomic % to not more than 4 atomic %, the content of the zinc atoms and/or the content of the manganese atoms (or a total content, if both zinc atoms and manganese atoms are incorporated) is from not less than 0.1 atomic % to not more than 5 atomic %, preferably not less than 0.5 atomic % to not more than 4 atomic %; and in that the abundance ratio among the iron atoms, nickel atoms, aluminum atoms, silicon atoms, and zinc atoms and/or manganese atoms (iron atoms: nickel atoms; aluminum atoms; silicon atoms; zinc atoms and/or manganese atoms) present in the superficial portion of individual magnetic metal particles is (100):(not more than 4):(10 to 60):(10 to 70):(20 to 80) in terms of number of atoms, preferably, (100):(not more than 2):(20 to 50):(20 to 60):(30 to 70).

The significance of the invention is that it specifies both the contents of the metal atom types in the magnetic metal powder, and the abundance ratio among the metal atom types in the superficial portion of individual magnetic metal particles.

Since comprising not less than 90 atomic % of iron atoms and having the above-specified amount of Ni, the magnetic metal powder of the invention has good electromagnetic conversion properties. The above-specified amount of silicon atoms contained prevents sintering of magnetic powder. The above-specified amount of aluminum atoms contained improves corrosion resistance of magnetic metal powder. The above-specified amount of zinc and/or manganese atoms promotes crystal growth of magnetic powder. In other words, the zinc atoms contained accelerate growth of aciculer crystals of magnetic powder, while the manganese atoms contained allows the crystals to be thicker and shorter so as to improve a squareness ratio of a magnetic recording medium.

The abundance ratio of iron atoms to nickel atoms present in the surface region of individual magnetic metal particles, i.e. (100):(not more than 4), prevents nickel atoms that are readily rusted from being exposed on the superficial portion of individual magnetic metal particles, thereby anti-rusting properties and corrosion resistance of the magnetic powder are improved, while high electromagnetic conversion properties which an Fe—Ni series magnetic powder has are maintained. Additionally, since the present invention also specifies the abundance ratio of iron atoms present in the superficial portion of individual magnetic metal particles to other atom types, i.e. aluminum atoms, silicon atoms, zinc atoms and/or manganese atoms, the abundance ratio of iron atoms present in this area is significantly smaller than that of other regions. Accordingly, corrosion resistance action of aluminum and other atoms is positively provided, thus inhibiting oxidization of magnetic powder and improving dispersibility of the magnetic particles.

As described above, since oxidization resistance and dispersibility of magnetic metal powder are improved, it is possible to improve durability of a magnetic recording medium while maintaining excellent electromagnetic conversion properties of ultra-fine magnetic metal particles whose specific surface area not less than 45 $m^2/g$.

The magnetic metal powder of the invention is prepared according to the following process, for example. An iron hydroxide such as $\alpha$-FeOOH and $\gamma$-FeOOH or an iron oxide such as $\alpha$-$Fe_2O_3$, $\gamma$-$Fe_2O_3$ and $Fe_3O_4$ is reduced using $H_2$ or the like at a high temperature.

More specifically, a ferrous salt compound such as $FeSO_4$ and $FeCl_2$ is allowed to react with an alkali such as NaOH, thereby $\alpha$-FeOOH is generated. The so-obtained $\alpha$-FeOOH is reduced at a high temperature using, for example, $H_2$ or, otherwise, the $\alpha$-FeOOH is converted into $\alpha$-FeOOH, thereby ether of which is reduced (using, for example, $H_2$) at a high temperature to obtain magnetic metal powder. In any of these steps, an Al compound, Ni compound and Si compound can be added. And at least either Zn compound or Mn compound can be further added in such a manner. This explanation also applies to a case where in a compound other than that of Fe is added.

The specific surface area mentioned above is expressed in BET value, and which means a surface area per unit weight, and is a physical unit totally different from average grain size. Accordingly, with two types of powder having a common average grain size, one type can have a larger specific surface area, while the other can have a smaller specific surface area. In measuring a specific surface area, powder is, for example, first subjected to deaeration with heating at approximately 250° C. for 30 to 60 minutes, thereby what have been adsorbed on powder particles are eliminated, and then, the powder is introduced into a measuring apparatus, and measurement based on nitrogen adsorption is performed at a liquid nitrogen temperature ($-195°$ C.) with the initial nitrogen pressure of 0.5 kg/m² (measurement technique for specific surface area known as BET technique, for details, refer to Journal of American Chemical Society, 60 309 (1938). A measurement apparatus applicable to measuring the specific surface area (BET value) is "powder measurement apparatus, Quantersorb, manufactured jointly by Yuasa Battery Co., Ltd. and Yuasa Ionics Co., Ltd. General description of the specific surface area and measuring methods is detailed in "Measurement of Powder" (J. M. Dallavalle & Clydeorr Jr., translated by Muta et. al., published from "Sangyo Tosho"), and also is described in "Chemical Handbook" (Application Section. pp. 1170–1171, Society of Chemistry in Japan, published from Maruzen, Apr. 30, 1966) (the term "surface area" in m²/g described in "Chemical Handbook" above is identical to "specific surface area" in this specification).

A binder useful in the present invention is one whose average molecular weight being approx. 10000 to 200000, and the examples of which include a urethane resin, a vinyl chloride-vinyl acetate copolymer, a vinyl chloride-vinilidene chloride copolymer, a vinyl chloride-acrylnitrile copolymer, a butadiene-acrylnitrile copolymer, a polyamide resin, a polyvinyl butyral, cellulose derivatives such as cellulose acetate butylate, cellulose diacetate, cellulose triacetate, cellulose propionate, and nitrocellulose, a styrene-butadiene copolymer, polyester resin, various synthetic rubbers, a phenol resin, an epoxy resin, a urea resin, a melamine resin, a phenoxy resin, silicone resin, an acryl-based reactive resin, a mixture of high-molecular polyester resin and isocyanate prepolymer, a mixture of polyester polyol and polyisocyanate, a low-molecular glycol/high-molecular diol/isocyanate mixture, and mixtures of the above-mentioned materials.

These resins are preferably those having a hydrophilic polar group such as $-SO_3M$, $-COOM$, and $-PO(OM')_2$; wherein M represents a hydrogen atom, or an alkali metal atom such as lithium, potassium, and sodium, and M' represents a hydrogen atom, or an alkali metal atom such as lithium, potassium, and sodium, or a hydrocarbon residue. This is because an intramolecular polar group allows such a resin to have much improved affinity with magnetic metal powder, thereby the dispersibility of magnetic powder is improved and aggregation of the magnetic metal powder is inhibited, thus further improving the stability of coating solution, and, as a result, also improving the durability of a magnetic recording medium.

Useful binders, especially vinyl chloride-based copolymers, can be obtained by subjecting, to copolymerization, a vinyl chloride monomer and a copolymerisable monomer that contains sulfonic or phosphoric alkali salt, as well as, according to a specific requirement, another copolymerisable monomer. The intended copolymer is readily synthesized owing to vinyl synthesis. Furthermore, since copolymeric units are arbitrarily selected, optimum properties for the resultant copolymer can be attained.

The metal in the above-mentioned sulfonic or phosphoric salt is an alkali metal (especially, sodium, potassium, and lithium). The most advantageous is potassium because of its solubility, reactivity and resultant yield.

The examples of the above-mentioned copolymerisable monomer containing sulfonic salt are as follows:
 $CH_2=CHSO_3M$
 $CH_2=CHCH_2SO_3M$
 $CH_2=C(CH_3)CH_2SO_3M$
 $CH_2=CHCH_2OCOCH(CH_2COOR)SO_3M$
 $CH_2=CHCH_2OCH_2(OH)CH_nSO_3M$
 $CH_2=C(CH_3)COOC_2H_4SO_3M$
 $CH_2=CHCOOC_4H_8SO_3M$
 $CH_2=CHCONHC(CH_3)_2CH_2SO_3M$ The examples of the above-mentioned copolymerisable monomer containing phosphoric salt are as follows:
 $CH_2=CHCH_2OCH_2CH(OH)CH_2-O-PO_3MY^1$
 $CH_2=CHCONHC(CH_3)_2CH_2-O-PO_3MY^2$

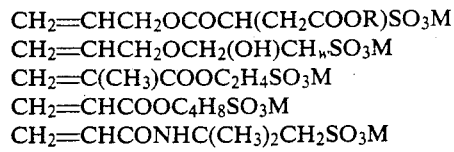

$CH_2=CHCH_2O(CH_2CH_2O)_mPO_2MX^2$ wherein M represents an alkali metal atom; R represents an alkyl group having 1 to 20 carbon atoms; $Y^1$ represents H, M or $CH_2=CHCH_2OCH_2CH(OH)CH_2-$;
$Y^2$ represents H, M or $CH_2=CHCONHC(CH_3)_2CH_2-$;
$X^1$ represents

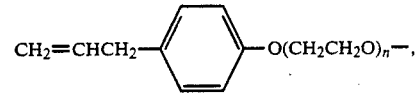

OH pr OM; n represents an integer 1–100: m represents an
 or OM; $X^2$ represents $CH_2=CHCH_2O(CH_2CH_2O)_m-$, OH integer 1 to 100.

The copolymerisable monomer subjected to copolymerization, in accordance with a specific requirement is a known polymerisable monomer, and the examples of which include various vinyl esters, vinilidene chloride, acrylnitrile, methacrylnitrile, styrene, acrylic acid, methacrylic acid, various acrylic acid esters, methacrylic acid esters, ethylene, propylene, isobutene, butadiene, isoprene, vinyl ether, aryl ether, aryl ester, acrylamide, methacrylamide, maleic acid, and maleic acid ester.

The above-mentioned binders are prepared by polymerization such as emulsification polymerization, solution polymerization, suspension polymerization, and mass polymerization. In any of these processes, known methods are performed according to a specific requirement, and the examples of such methods include intermittent or continuous addition of a molecular weight adjuster, polymerization initiator and monomers.

The preferred monomer percentage in the above-mentioned acid salt in a binder of the invention is 0.01 to 30 mol %. A salt of excessively high monomer percentage results in poor solubility of a binder in a solvent, or readily causes gelation A salt of excessively small monomer percentage causes failure in attaining intended properties.

Furthermore, the vinyl chloride based copolymer above preferably contains an epoxy group or hydroxy group. Incidentally, a conventional vinyl chloride based copolymer (for example, VAGH manufactured by U.C.C.) comprises the following copolymeric units.

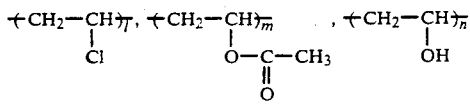

:each represents a copolymeric unit.

wherein a CH₃CO—O— group does not seem to promote crosslinking reaction of the binder with a hardener or the like. Therefore, it is preferable to replace CH₃CO with an epoxy group such as

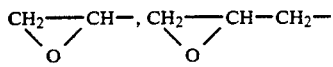

One preferred copolymer is one that has the following units:

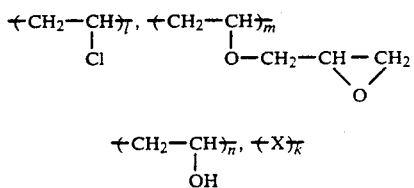

wherein X represents a monomer unit containing an alkali metal salt of a sulfo group or phospho group.

A binder particularly preferably incorporates at least a urethane resin, and, further preferably, also incorporates a vinyl chloride copolymer, an epoxy resin, especially, a phenoxy resin, a polyester resin, or a nitrocellulose resin (these resins are hereinafter referred to as another (other) resin(s)). When using a urethane resin along with another resin, the proportion of another resin is 90 to 10 wt parts, or, preferably, 80 to 20 wt parts. A proportion of another resin, exceeding 90 wt parts, results in too vulnerable a coated layer whose durability being significantly poor, and, at the same time, a coated layer does not stably adhere to a support of a magnetic recording medium. A proportion of another resin, less than 10 wt parts, results in more frequently falling-off of magnetic powder.

Incorporating carbon black into a magnetic layer further improves traveling properties and electromagnetic conversion properties of a magnetic recording medium, and, this arrangement also marginally improves the dispersibility of binder resins, and further decreases an amount of residual solvent in a magnetic recording layer.

Carbon black for light-shielding grade can further enhance the degree of light-shielding. The examples of applicable carbon black of light-shielding grade include Raven 2000 (specific surface area, 1190 m²/g, grain size 18 mμ), Raven 2100, Raven 1170, and Raven 1000, each manufactured by Columbian Carbon; and #100, #75, #40, #35, and #30, each manufactured by Mitsubishi Chemical Industries Ltd.

The examples of electrical conductive carbon black include Conductex 975 (BET value, hereinafter referred to as BET, 250 m²/g; DBP oil absorption, hereinafter referred to as DBP, 170 ml/100 g; grain size, 24 mμ), Conductex 900 (BET, 125 m²/g; grain size, 27 mμ), Conductex 40-220 (grain size, 20 mμ), Conductex SC (BET, 220 m²/g; DBP, 115 ml/100 g; grain size, 20 mμ), each manufactured by Columbian Carbon; Vulcan XC-72 (specific surface area, 254 m /g; grain size, 30 mμ), and Vulcan P (BET, 143 m²/g; DBP, 118 mμ/100 g; grain size, 20 mμ), Raven 1040, Raven 420, Black Pearls (grain size, 15 mμ), each manufactured by Cabot; and #44 of Mitsubishi Chemical Industries Ltd.

The examples of other applicable carbon blacks include Vulcan 9 (BET, 140 m²/g; DBP, 114 mμ/100 g; grain size, 19 mμ) manufactured by Cabot; #80 of Asahi Carbon (BET, 117 m²/g; DBP, 113 mμ/100 g; grain size, 23 mμ); HS100 of DENKI KAGAKU (BET, 32 m²/g; DBP, 180 mμ/100 g; grain size, 53 mμ); #22B (BET, 55 m²/g; DBP, 131 mμ/100 g; grain size, 40 mμ), #20B (BET, 56 m²/g; DBP, 115 mμ/100 g; grain size, 40 mμ), and #3500 (BET, 47 m²/g; DBP, 187 mμ/100 g; grain size, 40 mμ), each manufactured by Mitsubishi Chemical Industries Ltd. The examples further include CF-9, #4000, and MA-600 of Mitsubishi Chemical Industries Ltd.; Black Pearls L, Monarck 800, Black Pearls 700, Black Pearls 1000, Black Pearls 880, Black Pearls 900, Black Pearls 1300, Black Pearls 2000, and Sterling V, each manufactured by Cabot; Raven 410, Raven 3200, Raven 420, Raven 450, Raven 825, Raven 1255, Raven 1035, Raven 1000, Raven 2000, Raven 5000, and Ketchen Black FC, each manufactured by Columbian Carbon.

Additionally, according to the invention, to improve durability of a magnetic recording medium, to a magnetic coating solution containing a binder can be added a polyisocyanate based hardener The examples of such a polyisocyanate based hardener include conventional hardeners, for example, bivalent isocyanates such as trilenediisocyanate, diphenylmethanediisocyante, and hexanediisocyanate; trivalent isocyanates such as Coronate L (Japan Polyurethane Co.), and Desmodur L (Bayer); a urethane polymer having on its both ends isocyanate groups; and other polyisocyanates that can be used as a hardener. The amount of polyisocyanate based hardener is 5 to 80 wt parts per total amount of binder.

A magnetic recording medium of the invention comprises, for example, as shown in FIG. 1, a non-magnetic support 1 of polyethylene terephthalate or the like disposed thereon a magnetic layer 2, and on the other face of the support 1 is provided, according to a specific requirement, a back coating layer (BC layer) 3. As shown in FIG. 2, an over-coating layer (OC layer) 4 may be additionally formed on the magnetic layer 2 of the magnetic recording medium in FIG. 1.

The magnetic recording medium either in FIG. 1 or FIG. 2 may have or may not have a subbing layer (unshown) between the magnetic layer 2 and the support 1. The support may be subjected to corona discharge treatment.

The magnetic layer can contain a fatty acid and/or fatty acid ester as a lubricant, in addition to a magnetic metal powder and a binder each mentioned above. By doing so, the characteristics of both fatty acid and ester thereof are fully demonstrated, and the deficiency that will be otherwise manifest when both are independently employed is compensated by simultaneously using both fatty acid and ester thereof, and thereby still image durability, traveling stability and S/N ratio are further improved. For this purpose, the preferred amount of fatty acid added is within a range of 0.2 to 10 wt parts, in particular, 0.5 to 8.0 wt parts per 100 wt parts of magnetic powder. If the amount of fatty acid is lower than this range, the dispersibility of the magnetic powder is smaller, and the traveling properties of the recording medium tends to become poor; if the amount is higher than this range, the fatty acid tends to be eluted from a medium, and the output level tends to be lower. The preferred amount of fatty acid ester added is within a range of 0.1 to 10 wt parts, in particular, 0.2 to 8.5 wt parts per 100 wt parts of magnetic powder. If the amount of fatty acid ester is lower than this range, the improvement on the traveling properties is less significant; if the amount is higher than this range, fatty acid ester tends to be eluted from the medium, and the output level tends to be lower.

To achieve the above effects more positively, the preferred weight ratio of fatty acid to fatty acid ester 10/90 to 90/10. Fatty acid also has dispersing property, and it can contribute to decreasing amount of a low molecular dispersing agent used. Therefore, a better Young's modulus of the magnetic recording medium can be expected.

The fatty acids applicable to this purpose may be either monobasic or dibasic types. The preferred fatty acids independently have 6 to 30, particularly, 12 to 22 carbon atoms. The typical such fatty acids are as follows:
(1) caproic acid
(2) caprylic acid
(3) capric acid
(4) lauric acid
(5) myristic acid
(6) palmitic acid
(7) stearlic acid
(8) isostearlic acid
(9) linolenic acid
(10) linoleic acid
(11) oleic acid
(12) elaidic acid
(13) behenic acid
(14) malonic acid
(15) succinic acid
(16) maleic acid
(17) glutaric acid
(18) adipic acid
(19) pimelic acid
(20) azelaic acid
(21) sebacic acid
(22) 1,12-dodecandicarboxylic acid
(23) octanedicarboxylic acid
The examples of fatty acid ester are as follows:
(1) oleyl olate
(2) oleyl stearate
(3) isocetyl stearate
(4) dioleyl maleate
(5) butyl stearate
(6) butyl palmitate
(7) butyl myristate
(8) octyl myristate
(9) octyl palmitate
(10) amyl stearate
(11) amyl palmitate
(12) isobutyl oleate
(13) stearyl stearate
(14) lauryl oleate
(15) octyl oleate
(16) isobuty oleate
(17) ethyl oleate
(18) isotridecyl oleate
(19) 2-ethylhexyl stearate
(20) 2-ethylhexyl myristate
(21) ethyl stearate
(22) 2-ethylhexyl palmitate
(23) isopropyl palmitate
(24) isopropyl myristate
(25) butyl laurate
(26) cethyl-2-ethyl hexalate
(27) dioleyl adipate
(28) diethyl adipate
(29) diisobutyl adipate
(30) diisodecyl adipate Other than the above-exemplified fatty acids or fatty acid esters, the magnetic layer may contain other lubricants such as silicone oil that is either carboxylic acid modified or ester modified; and graphite, fluorocarbon, molybdenum disulfide, tungsten disulfide, fatty acid amide and α-olefine oxide.

The magnetic layer may also incorporate non-magnetic abrasive particles, and the examples of this abrasive include α-alumina, chromium oxide, titanium oxide, α-iron oxide, silicon oxide, silicon nitride, silicon carbide, zirconium oxide, zinc oxide, cerium oxide, magnesium oxide, and boron nitride. The preferred average particle size of such an abrasive is 0.6 μm, in particular, not more than 0.3 μm. The preferred Moh's hardness, of such an abrasive is not less than 5.

The magnetic layer may further contain a charge controlling agent such as graphite, and a dispersing agent such as powder lecithin and phosphoric ester, as well as carbon black.

The preferred average particle size of non-magnetic powder the back coating layer may contain is 10 to 1000 mμ. This range of particle size means not too fine particles, and hence effect by addition is satisfactory.

The examples of applicable non-magnetic powder include silicon oxide, silicon carbide, calcium carbide, zinc oxide, α-$Fe_2O_3$, talc, caolin, calcium sulfate, boron nitride, zinc fluoride, molybdenum dioxide, calcium carbonate, and barium sulfate Other useful non-magnetic powder include organic powder whose types being benzoguanamine resin, and melamine resin, as well as phthalacyanine dye. Such organic powder can be used in conjunction with the previously mentioned inorganic powder.

Using carbon black in conjunction with the previously mentioned inorganic powder is particularly preferable. This arrangement further stabilizes the traveling properties of a magnetic recording medium, and, together with the previously mentioned action of non-magnetic powder, further improves durability of a magnetic recording medium

EXAMPLES

The examples of the present invention are hereunder described.

However, embodiment of the invention is not limited to the examples Incidentally, the term "part" in the following examples always means "part by weight".

EXAMPLE 1

(Preparation of Video Tape)

First, according to a process described below, each magnetic layer was formed on a 10 μm thick polyethylene terephthalate base film serving as a support.

Next, a specific magnetic powder and the ingredients listed in Table 1 were dispersed, and the resultant magnetic paints were filtered through a 1 μm sieve filter, and then 5 parts multifunctional isocyanate was added, and thereafter the support was coated with the resultant dispersion in a thickness of 2.5 μm and treated with a super calendar Thus the magnetic layers having the properties and compositions shown in Table 1 were formed.

Incidentally, for magnetic metal powders, Table 1 also summarizes the contents of iron atoms, aluminum atoms and nickel atoms in the magnetic powder, and the abundance ratio of these atoms in the superficial portion of individual magnetic metal particles. The abundance ratio was measured, according to the ESCA, by determining an abundance ratio at an analysis depth of approx. 100Å and less from the surface toward inside. The contents of these atoms were measured by an X ray spectroscopy.

FIG. 3 graphically shows the degrees of oxidation of aluminum atoms in the superficial portion of individual magnetic particles.

In FIG. 3, the vertical axis corresponds with a spectral intensity measured with a counter, while the horizontal axis corresponds with binding energy (eV). The peak level of the binding energy shown is at 76.8 eV, whereas according to a handbook, non-oxidized pure aluminum has peak cohesive energy of 72.7 eV in contrast with the peak level of aluminum oxide, i.e. 76.8 eV.

A magnetic metal powder used in the examples of the invention is prepared according to the following process, for example.

An iron hydroxide such as $\alpha$-FeOOH and $\gamma$-FeOOH or an iron oxide such as $\alpha$-Fe$_2$O$_3$, $\gamma$-Fe$_2$O$_3$ and Fe$_3$O$_4$ is reduced using H$_2$ or the like at a high temperature. More specifically, a ferrous salt compound such as FeSO$_4$ and FeCl$_2$, is allowed to react with an alkali (such as NaOH, thereby $\alpha$-FeOOH is generated. The so-obtained $\alpha$-FeOOH is reduced using, for example, H$_2$ or, otherwise, the $\alpha$-FeOOH is converted into $\alpha$-FeOOH, thereby ether of which is reduced (using, for example, H$_2$) at a high temperature to obtain magnetic metal powder. In any of these steps, an Al or Ni compound can be added in accordance with a specific requirement. This explanation also applies to a compound other than that of Fe.

In order to oxidize aluminum atoms in the superficial portion of individual magnetic metal particles, there is a method where magnetic metal powder is allowed to stand in an atmosphere that has oxygen or OH group in a limited amount enough for oxidizing the superficial portion of the magnetic metal particles so as to oxidize the aluminum atoms in the superficial portion alone, wherein these aluminum atoms are derived from an aluminum compound added in a later step of reaction in the course of manufacturing magnetic metal powder.

Next, an opposite face of the support was coated with a paint for BC layer having the following ingredients, so that the dry thickness was 0.4 μm.

| | |
|---|---|
| Carbon black (average size, 50 mμ) | 40 parts |
| Barium sulfate | 10 parts |
| Nitrocellulose | 25 parts |
| N-2301 (Nippon Polyurethane) | 25 parts |
| Coronate L (Nippon Polyurethane) | 10 parts |
| Cyclohexanone | 400 parts |
| Methyl ethyl ketone | 250 parts |
| Toluene | 250 parts |

Thus, the wide magnetic films respectively having a magnetic layer and BC layer of prescribed thicknesses were prepared and rolled up. A respective magnetic film was cut into 8 mm width tapes to form the video tapes specified in Table 1 (each video tape corresponding with the identification number of example or comparative example). The "parts" in the second row and below in Table 1 are in parts by weight; "Ex" means an example of the invention, while "Comp" means a comparative example.

Performance Measurement of Video Tapes

The measurements of performance resultant from the so-obtained tapes are listed in Table 1. The evaluation criteria those data were based on are as follows.

Luminance S/N

Determined using a color video noise meter "Shibasoku, Model 925 D/1". The threshold level of the high-pass filter was 4.2 MHz; that of the low-pass filter was 10 KHz. The VTR used was an 8 mm video deck.

Still Image Endurance

This is a duration, represented in minutes, where the level of a still image decreases by 2 dB. The larger the level is, the greater the endurance and wear resistance of the magnetic recording medium.

Saturated Magnetization Residual Rate

The sample tape was allowed to stand for 1 week under the conditions of 60° C., and 80% RH, and then the saturated magnetization was measured The residual magnetization is represented by percentage of the saturated magnetization after aging of the initial saturated magnetization. Falling-off of powder, clogging of magnetic head:

A sample tape was allowed to run on a videotape deck for 2000 hours under the conditions of 40° C., and 80 % RH, in order to evaluate falling-off of powder and clogging of a magnetic head.
E: Excellent
G: Good
P: Poor
NG: Not good

TABLE 1

| | | | Ex No. 1 100 parts | Ex No. 2 100 parts | Ex No. 3 100 parts | Ex No.4 100 parts | Comp No. 1 100 parts | Comp No. 2 100 parts | Comp No. 3 100 parts | Comp No. 4 100 parts |
|---|---|---|---|---|---|---|---|---|---|---|
| Magnetic paint composition | Magnetic metal powder | Content of Fe atoms (atomic %) | 90 | 90 | 90 | 95 | 88 | 90 | 90 | 90 |
| | | Content of Al atoms (atomic %) | 5 | 0.1 | 5 | 2.3 | 5 | 5 | 6 | 0 |
| | | Content of Ni atoms (atomic %) | 4 | 9.8 | 0.1 | 2.5 | 4 | 4 | 3 | 1.0 |
| | | State of Al atoms in superficial portion of metal particles | Bound with oxygen | Same as left | Same as left | Same as left | Same as left | Same as left | Same as left | (No Al) |
| | | Abundance ratio in superficial | 100:60:0 | 100:40:0 | 100:80:0 | 100:60:0.1 | 100:30:0 | 100:60:0 | 100:150:0 | 100:0:20 |

TABLE 1-continued

|  |  | Ex No. 1 100 parts | Ex No. 2 100 parts | Ex No. 3 100 parts | Ex No.4 100 parts | Comp No. 1 100 parts | Comp No. 2 100 parts | Comp No. 3 100 parts | Comp No. 4 100 parts |
|---|---|---|---|---|---|---|---|---|---|
|  | portion (Fe:Al:Ni) Specific surface area: BET value (m$^2$/g) | 50 | 50 | 50 | 45 | 45 | 40 | 50 | 50 |
|  | Vinyl chloride copolymer | 13 Parts | 13 Parts | 13 Parts | 13 Parts | 13 Parts | 13 Parts | 13 Parts | 13 Parts |
|  | Polyurethane | 10 Parts | 10 Parts | 10 Parts | 10 Parts | 10 Parts | 10 Parts | 10 Parts | 10 Parts |
|  | Alumina | 9 Parts | 9 Parts | 9 Parts | 9 Parts | 9 Parts | 9 Parts | 9 Parts | 9 Parts |
|  | Methylethyl ketone | 250 Parts | 250 Parts | 250 Parts | 250 Parts | 250 Parts | 250 Parts | 250 Parts | 250 Parts |
|  | Toluene | 200 Parts | 200 Parts | 200 Parts | 200 Parts | 200 Parts | 200 Parts | 200 Parts | 200 Parts |
|  | Oleic acid | 2 Parts | 2 Parts | 2 Parts | 2 Parts | 2 Parts | 2 Parts | 2 Parts | 2 Parts |
|  | Stearic acid | 2 Parts | 2 Parts | 2 Parts | 2 Parts | 2 Parts | 2 Parts | 2 Parts | 2 Parts |
|  | Butyl stearate | 1 Parts | 1 Parts | 1 Parts | 1 Parts | 1 Parts | 1 Parts | 1 Parts | 1 Parts |
| Properties | Luminance S/N ratio (dB) | 1.5 | 2.0 | 2.5 | 2.0 | 0 | 0.5 | 0 | 0.5 |
|  | Still image endurance (min.) | >120 | >120 | >120 | >120 | 110 | 100 | 90 | 60 |
|  | Residual saturated magnetization (%) | 93 | 92 | 94 | 93 | 92 | 92 | 93 | 81 |
|  | Powder falling-off | G | G | E | G | P | NG | P | NG |
|  | Magentic head clogging | E | E | G | G | G | P | NG | NG |

EXAMPLE 2

Using prescribed magnetic alloy powders, magnetic layers of various compositions in Table 2 were prepared in a manner identical to that of Example 1.

In a manner identical to that of Example 1, an opposite face of the support was coated with a paint for BC layer, so that the dry thickness was 0.4 μm.

TABLE 2

|  |  | Sample Series | I 100 Parts | II 100 Parts | III 100 Parts | IV 100 Parts | V 100 Parts | VI 100 Parts |
|---|---|---|---|---|---|---|---|---|
| Magnetic-metal powder | Contents | Specific surface area (BET value, m$^2$/g) | Variable | 52 | 52 | 52 | 52 | 52 |
|  |  | Content of Fe atoms (atomic %) | — | Variable | — | — | — | — |
|  |  | Content of Ni atoms (atomic %) | — | — | Variable | — | — | — |
|  |  | Content of Al atoms (atomic %) | — | — | — | Variable | — | — |
|  |  | Content of Si atoms (atomic %) | — | — | — | — | Variable | — |
|  |  | Content of Zn atoms (atomic %) | — | — | — | — | — | Variable |
|  |  | Content of Mn atoms (atomic %) | — | — | — | — | — | — |
|  | Abundance ratio in superficial portion (relative to 100 Fe atoms) | Abundance ratio of Ni atoms | 0.5 | 0.5 | 0.5 | 0.5 | 0.5 | 0.5 |
|  |  | Abundance ratio of Al atoms | 35 | 35 | 35 | 35 | 35 | 35 |
|  |  | Abundance ratio of Si atoms | 40 | 40 | 40 | 40 | 40 | 40 |
|  |  | Abundance ratio of Zn atoms | — | — | 50 | 50 | 50 | 50 |
|  |  | Abundance ratio of Mn atoms | 50 | 50 | — | — | — | — |
| Magnetic paint composition |  | Vinyl chloride copolymer | 13 Parts | 13 Parts | 13 Parts | 13 Parts | 13 Parts | 13 Parts |
|  |  | Polyurethane | 10 Parts | 10 Parts | 10 Parts | 10 Parts | 10 Parts | 10 Parts |
|  |  | Alumina | 9 Parts | 9 Parts | 9 Parts | 9 Parts | 9 Parts | 9 Parts |
|  |  | Methylethyl ketone | 250 Parts | 250 Parts | 250 Parts | 250 Parts | 250 Parts | 250 Parts |
|  |  | Toluene | 200 Parts | 200 Parts | 200 Parts | 200 Parts | 200 Parts | 200 Parts |
|  |  | Oleic acid | 2 Parts | 2 Parts | 2 Parts | 2 Parts | 2 Parts | 2 Parts |
|  |  | Stearic acid | 2 Parts | 2 Parts | 2 Parts | 2 Parts | 2 Parts | 2 Parts |
|  |  | Butyl stearate | 1 Parts | 1 Parts | 1 Parts | 1 Parts | 1 Parts | 1 Parts |

|  |  | Sample Series | VII 100 Parts | VIII 100 Parts | IX 100 Parts | X 100 Parts | XI 100 Parts | XII 100 Parts |
|---|---|---|---|---|---|---|---|---|
| Magnetic-metal powder | Contents | Specific surface area (BET value, m$^2$/g) | 52 | 52 | 52 | 52 | 52 | 52 |
|  |  | Content of Fe atoms (atomic %) | — | — | — | — | — | — |
|  |  | Content of Ni atoms (atomic %) | — | — | — | — | — | — |
|  |  | Content of Al atoms (atomic %) | — | — | — | — | — | — |

TABLE 2-continued

|  |  |  |  |  |  |  |  |
|---|---|---|---|---|---|---|---|
| | | Content of Si atoms (atomic %) | — | — | — | — | — | — |
| | | Content of Zn atoms (atomic %) | — | — | — | — | — | — |
| | | Content of Mn atoms (atomic %) | Variable | — | — | — | — | — |
| | Abundance ratio in superficial portion (relative to 100 Fe atoms) | Abundance ratio of Ni atoms | 0.5 | Variable | 0.5 | 0.5 | 0.5 | 0.5 |
| | | Abundance ratio of Al atoms | 35 | 35 | Variable | 35 | 35 | 35 |
| | | Abundance ratio of Si atoms | 40 | 40 | 40 | Variable | 40 | 40 |
| | | Abundance ratio of Zn atoms | — | — | — | — | Variable | — |
| | | Abundance ratio of Mn atoms | 50 | 50 | 50 | 50 | 50 | Variable |
| Magnetic paint composition | Vinyl chloride copolymer | | 13 Parts | 13 Parts | 13 Parts | 13 Parts | 13 Parts | 13 Parts |
| | Polyurethane | | 10 Parts | 10 Parts | 10 Parts | 10 Parts | 10 Parts | 10 Parts |
| | Alumina | | 9 Parts | 9 Parts | 9 Parts | 9 Parts | 9 Parts | 9 Parts |
| | Methylethyl ketone | | 250 Parts | 250 Parts | 250 Parts | 250 Parts | 250 Parts | 250 Parts |
| | Toluene | | 200 Parts | 200 Parts | 200 Parts | 200 Parts | 200 Parts | 200 Parts |
| | Oleic acid | | 2 Parts | 2 Parts | 2 Parts | 2 Parts | 2 Parts | 2 Parts |
| | Stearic acid | | 2 Parts | 2 Parts | 2 Parts | 2 Parts | 2 Parts | 2 Parts |
| | Butyl stearate | | 1 Parts | 1 Parts | 1 Parts | 1 Parts | 1 Parts | 1 Parts |

With each criterion indicated as "variable" in Table 2, the amount was varied to prepare a series of samples, which were subjected to property evaluation.

Incidentally, the content ratios, shown in FIGS. 4 through 10, of respective atoms in individual magnetic metal particles were measured by an X-ray spectroscopy The abundance ratios of respective atoms in the superficial portion of individual magnetic particles were measured, according to the ESCA, by determining abundance ratios at an analysis depth of approx. 100Å and less from the surface toward inside

Sample Series I

Figure 4:
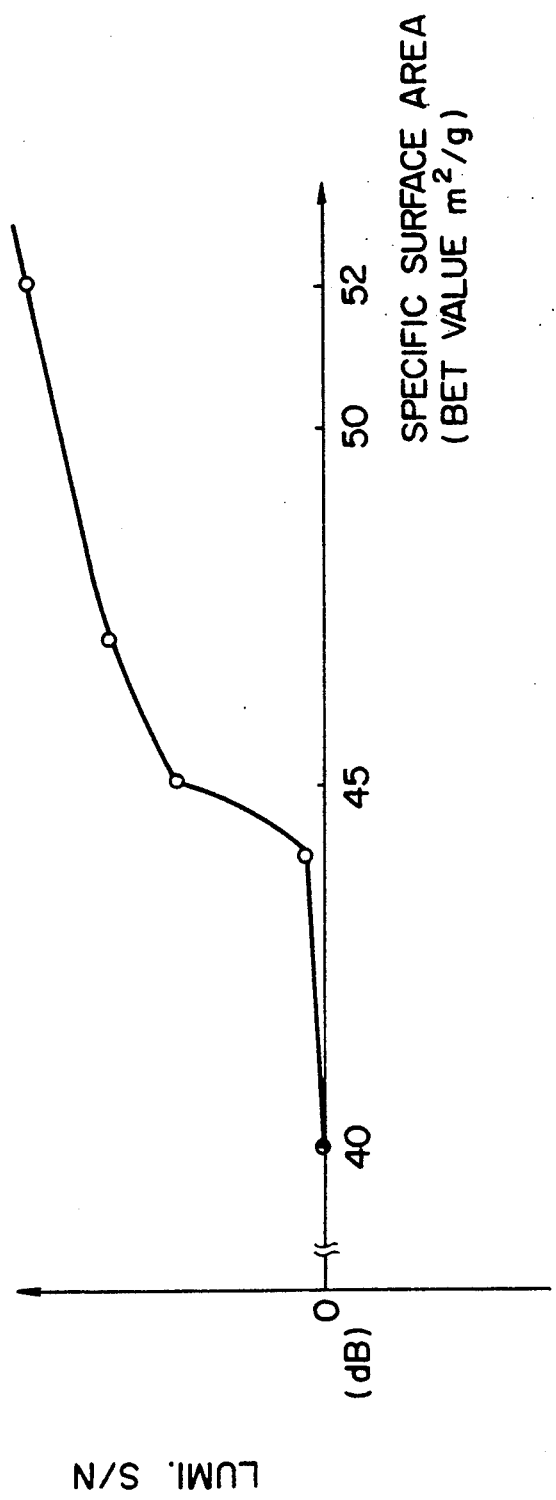
FIG. 4 graphically illustrates the correlation between the specific surface area of magnetic metal powder and the luminance S/N ratio of video tape.

The luminance S/N ratios of Sample Series I whose magnetic metal powders having various specific surface areas were measured, wherein variation of the luminance S/N ratio relative to a specific surface area peculiar to each sample is plotted in FIG. 4.

The measurement procedure of the luminance S/N ratio was same as that of Example 1.

Sample Series II

Figure 5:
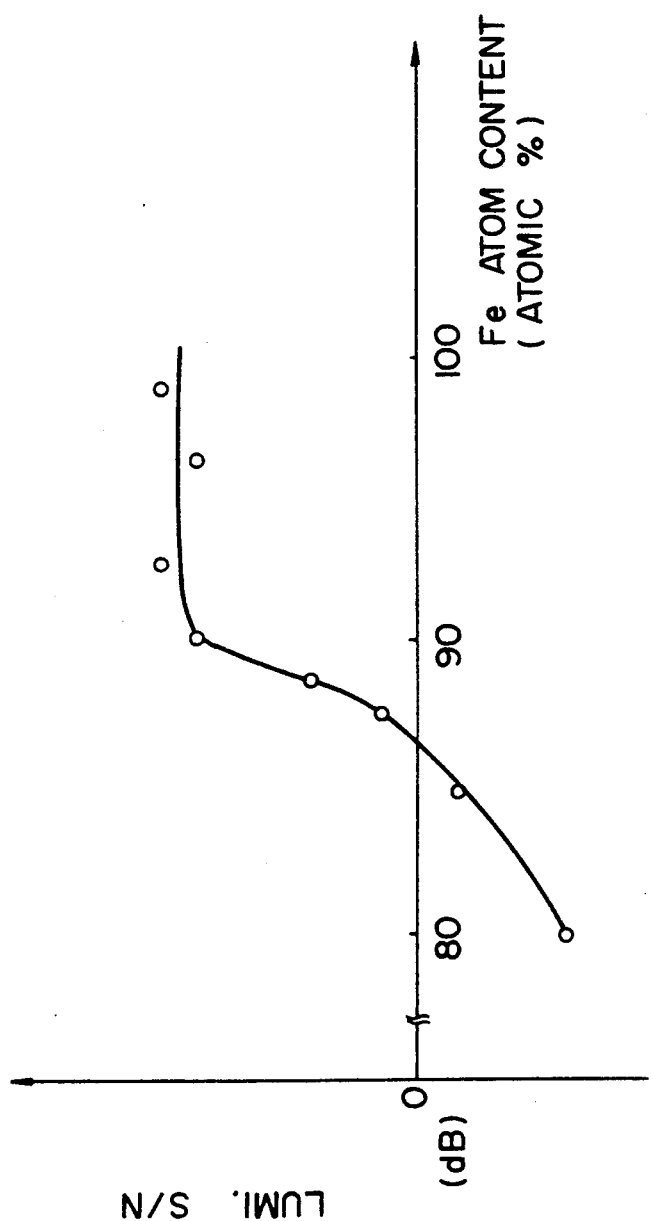
FIG. 5 graphically illustrates the correlation between the iron atom content in magnetic metal powder and the luminance S/N ratio.

The luminance S/N ratios of Sample Series II whose magnetic metal powders having various Fe atom contents were measured. The results of Fe content and measurement of each sample are indicated in FIG. 5.

Sample Series III and VIII

Figure 6:
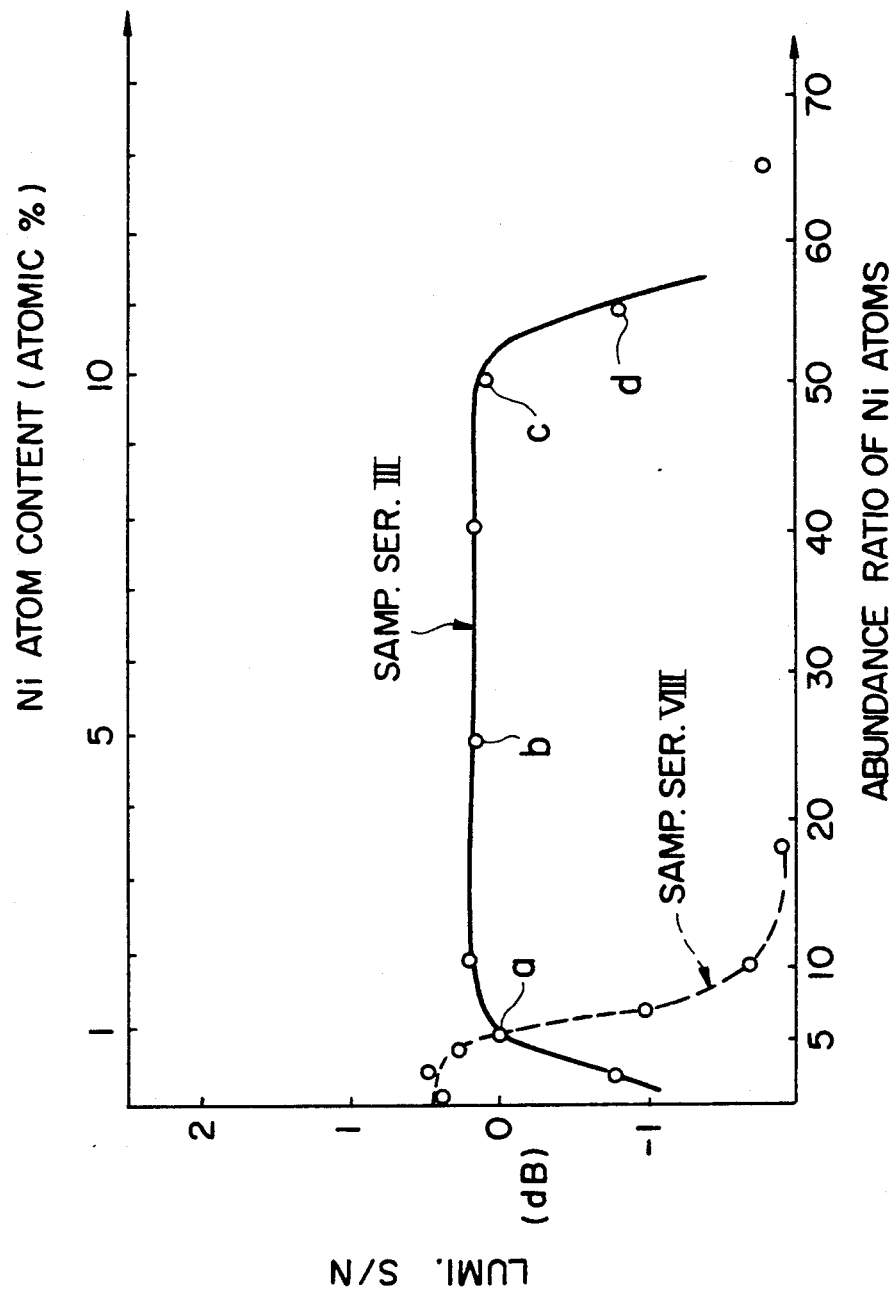
FIG. 6 graphically illustrates the interrelation among the nickel atom content in magnetic metal powder, the abundance ratio of nickel atoms in the superficial portions of magnetic metal particles, and the luminance S/N ratio.

The luminance S/N ratios of Sample Series III and VIII whose magnetic metal powders having various Ni atom contents (Series III) (also abundance ratio of Ni atoms in the superficial portion of individual magnetic metal particles was varied (Series VIII)) as shown in FIG. 6 were measured. The results are indicated in FIG. 6.

Additionally, Samples a, b, c, and d in FIG. 6 were evaluated for powder falling-off, and clogging of a magnetic head in a manner identical to that of Example 1. The results obtained are as follows.
a: Good
b: Excellent
c: Excellent
d: Not good

Sample Series IV and IX

Figure 7:
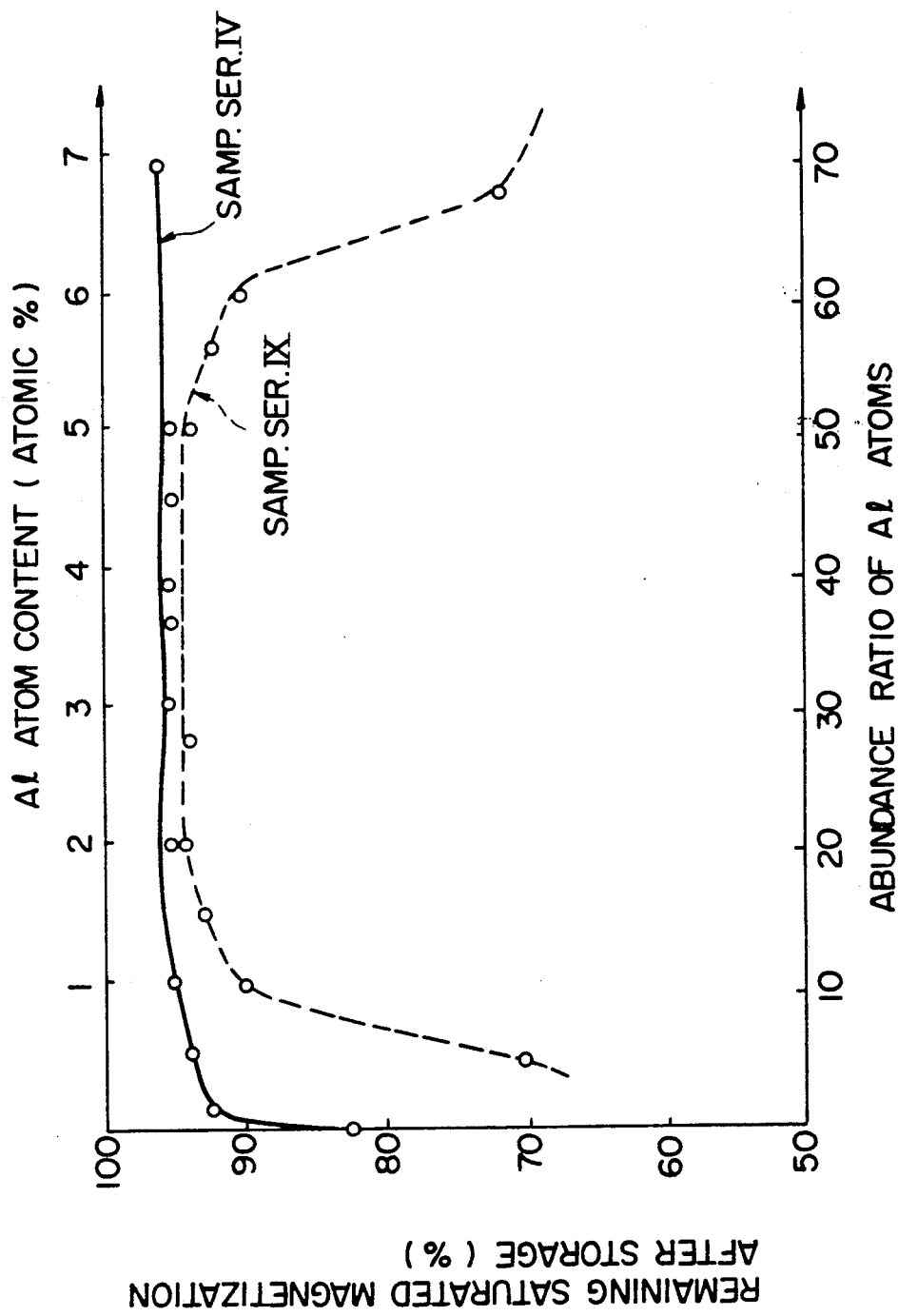
FIG. 7 graphically illustrates the interrelation among the aluminum atom content in magnetic metal powder, the abundance ratio of aluminum atoms in the superficial portions of magnetic metal particles, and the post-aging residual saturated magnetization.

The post-aging residual saturated magnetization ratios of Sample Series IV and IX whose magnetic metal powders having various Al atom contents (Series IV) (also abundance ratio of Al atoms in the surface region of individual magnetic metal particles was varied (Series IX)) as shown in FIG. 7 were measured. The results are indicated in FIG. 7.

Sample Series V and X

Figure 8:
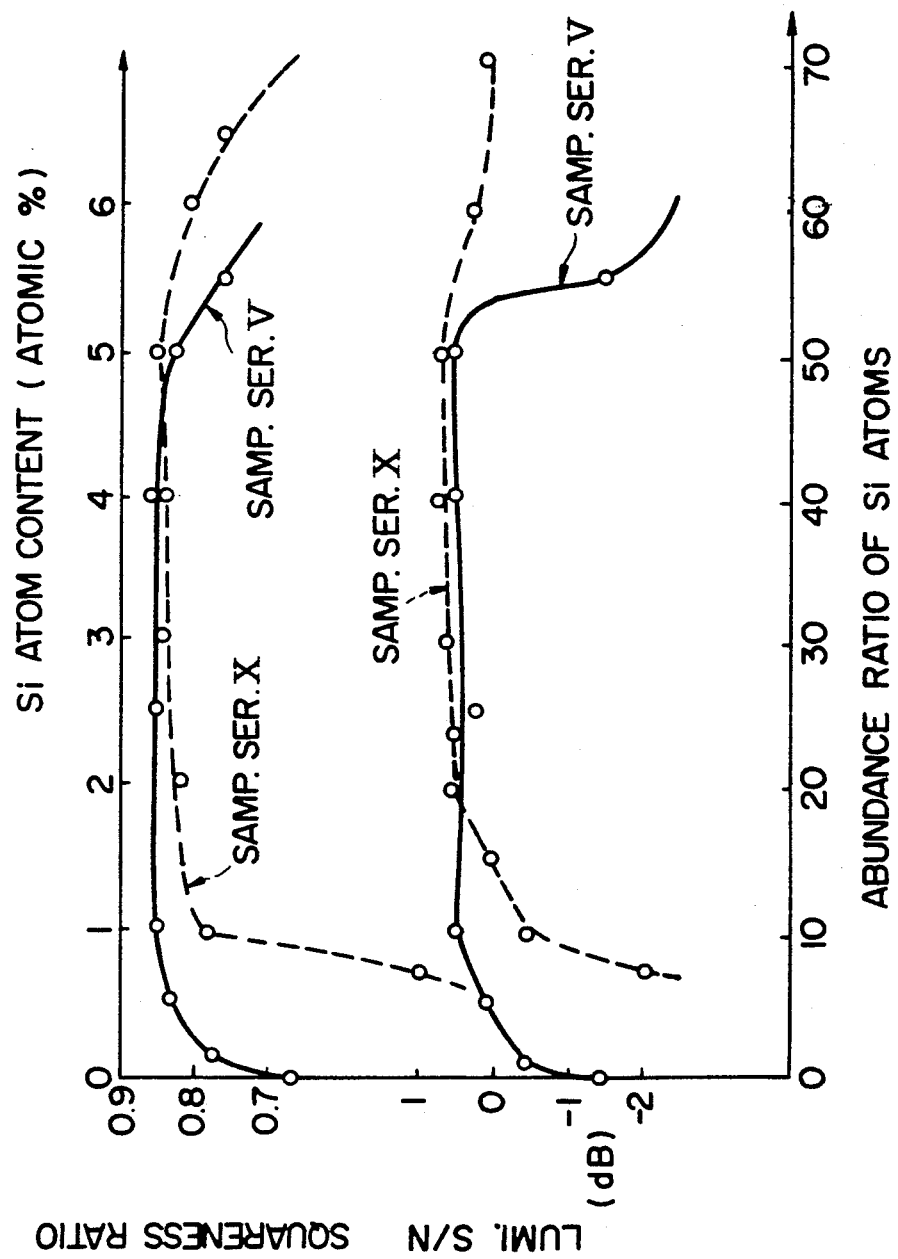
FIG. 8 graphically illustrates the interrelation among the silicon atom content in magnetic metal powder, the abundance ratio of silicon atoms in the superficial portions of magnetic metal particles, the square ratio, and the luminance S/N ratio.

The squareness ratios and luminance S/N ratios of Sample Series V and X whose magnetic metal powders having various Si atom contents (Series V) (also abundance ratio of Si atoms in the surface region of individual magnetic metal particles was varied (Series X)) as shown in FIG. 8 were measured. The results are indicated in FIG. 8.

Squareness Ratio

Using a sample-oscillating type magnetic-flux analyzer (Toei Kogyo), Br/Bm at Hm5KOe was determined.

Sample Series VI and XI

Figure 9:
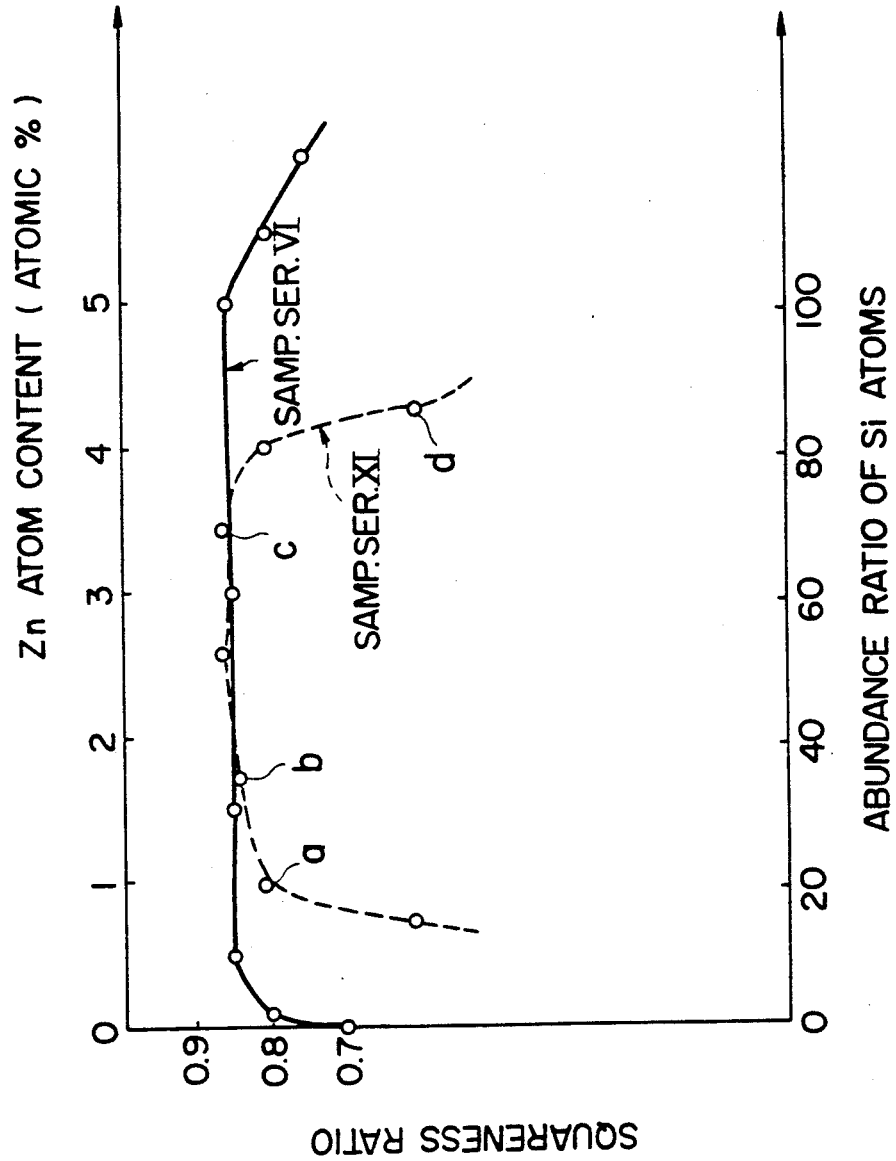
FIG. 9 graphically illustrates the interrelation among the zinc atom content in magnetic metal powder, the abundance ratio of zinc atoms in the superficial portion of magnetic metal particles, and the square ratio.

The square ratios of Sample Series VI and XI whose magnetic metal powders having various Zn atom contents (Series VI) (also abundance ratio of Zn atoms in the surface region of individual magnetic metal particles was varied (Series XI)) as shown in FIG. 9 were measured. The results are indicated in FIG. 9.

Additionally, Samples a, b, c, and d in FIG. 9 were evaluated for powder falling-off, and clogging of a magnetic head. The results obtained are as follows.
a: Good
b: Excellent
c: Excellent
d: Not good

Sample Series VII and XII

Figure 10:
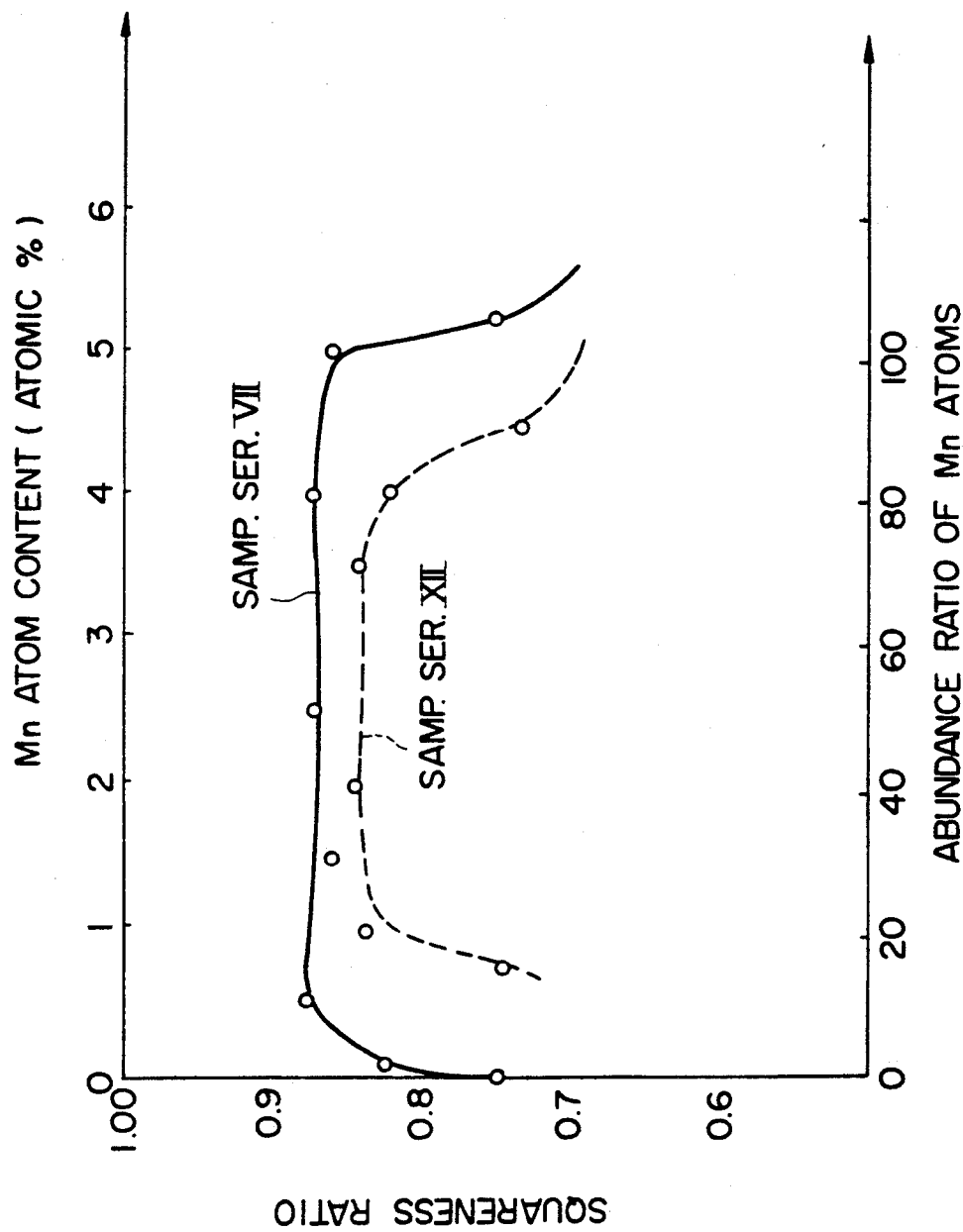
FIG. 10 graphically illustrates the interrelation among the manganese atom content in magnetic metal powder, the abundance ratio of manganese atoms in the superficial portion of magnetic metal particles, and the square ratio.

The squareness ratios of Sample Series VII and XII whose magnetic metal powders having various Mn atom contents (Series VII) (also abundance ratio of Mn atoms in the superficial portion of individual magnetic metal particles was varied (Series XII)) as shown in FIG. 10 were measured. The results are indicated in FIG. 10.

As can be apparent from the results above, composing a magnetic tape according to the invention significantly improves the performance of the tape. To sum up, a magnetic recording medium of the invention of the invention apparently has excellent performance, wherein the magnetic recording medium comprises magnetic metal powder whose BET value is not less than 45 m$^2$/g; and individual magnetic metal particles in the similar metal powder have prescribed content ratios of respective constituent atom types; and atom types of prescribed abundance ratios are present in the superficial portion of individual magnetic metal particles.

What is claimed is:

1. A magnetic recording medium comprising a nonmagnetic support having provided thereon a magnetic layer comprising a binder having a magnetic metal powder dispersed therein, wherein said magnetic metal powder comprises individual particles each having a surface portion, extending to a depth of not more than approximately 100 agnstroms said powder has a specific surface area of not less than 45 m$^2$/g, and comprises not less than 90 atomic percent iron atoms, not less than 0.1 to less than 5 atomic percent aluminum atoms, and not less than 0.1 to 9.7 atomic percent nickel atoms, a ratio of asid iron atoms, aluminum atoms, and nickel atoms in said surface portion of said individual particles of said magnetic metal powder being 100:(40 to 140):(0 to 10), in terms of number of atoms, said aluminum atoms in said surface portion being bound to oxygen atoms.

2. The medium of claim 1 wherein said powder has a specific surface area within the range of from 50 m$^2$/g to 70 m$^2$/g.

3. A magnetic recording medium comprising a nonmagnetic support having provided thereon a magnetic layer comprising a binder having a magnetic metal powder dispersed therein, wherein said magnetic metal powder comprises individual particles each having a surface portion, extending to a depth of not more than approximately 100 angstroms said powder has a specific surface area of not less than 45 m$^2$/g, and comprises not less than 90 atomic % of iron atoms, not less than 1 atomic % to 9.7 atomic % of nickel atoms, not less than 0.1 atomic % to less than 5 atomic % of aluminum atoms, not less than 0.1 atomic % to less than 5 atomic % of silicon atoms and 0.1 atomic % to 5 atomic % of zinc atoms, manganese atoms, or mixtures thereof, a ratio of said iron atoms, said nickel atoms, said aluminum atoms, said silicon atoms, and the total of said zinc atoms and said manganese atoms, in said surface portion is 100:(0 to 4):(10 to 60):(10 to 70):(20 to 80), respectively, in terms of number of atoms, said aluminum atoms in said surface portion being bound to oxygen atoms.

4. The medium of claim 3 wherein said ratio among said iron atoms, said nickel atoms, said aluminum atoms, said silicon atoms, and among the total of said zinc atoms and said manganese atoms in the surface portion of said individual particles of said powder is 100:(0 to 2):(20 to 50):(20 to 60):(30 to 70), respectively, in terms of number of atoms.

5. The medium of claim 3 wherein said powder has a specific surface area within the range of from 50 m$^2$/g to 70 m$^2$g.

6. A magnetic recording medium comprising a nonmagnetic support having provided thereon a magnetic layer comprising a binder having a magnetic metal powder dispersed therein, wherein said magnetic metal powder comprises individual particles each having a surface portion, extending to a depth of not more than approximately 100 angstroms said powder has a specific surface area of not less than 45 m$^2$/g, wherein said powder comprises not less than 90 atomic % of iron atoms, not less than 3 atomic % to not more than 8.5 atomic % of nickel atoms, not less than 0.5 atomic % to not more than 4 atomic % of aluminum atoms, not less than 0.5 atomic % to not more than 4 atomic % of silicon atoms, and not less than 0.5 atomic % to not more than 4 atomic % of the total of zinc atoms and manganese atoms.

7. The medium of claim 6 wherein said powder has a specific surface area within the range of from 50 m$^2$/g to 70 m$^2$/g.

* * * * *